A. W. MALEY.
MANUFACTURE OF ELECTRICAL RESISTANCES.
APPLICATION FILED JAN. 23, 1914.
1,118,906.
Patented Nov. 24, 1914.
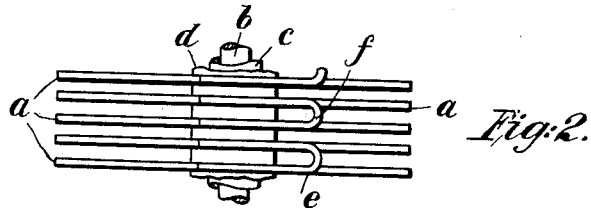
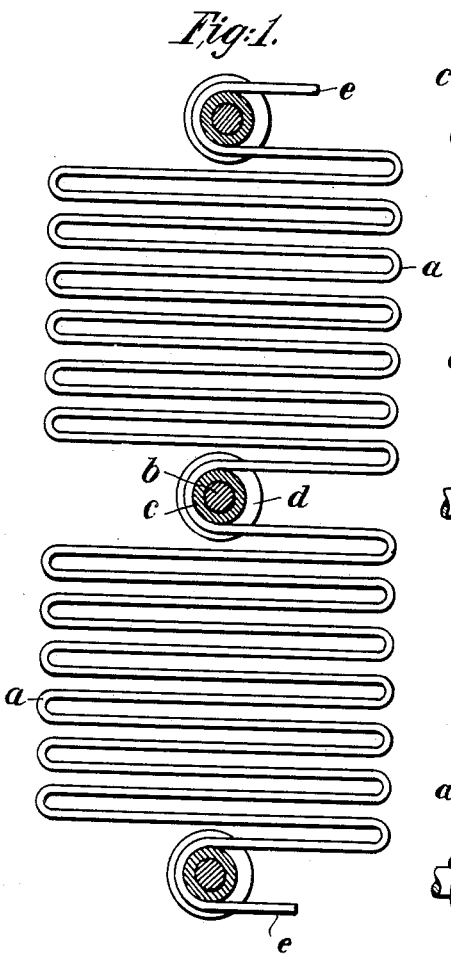
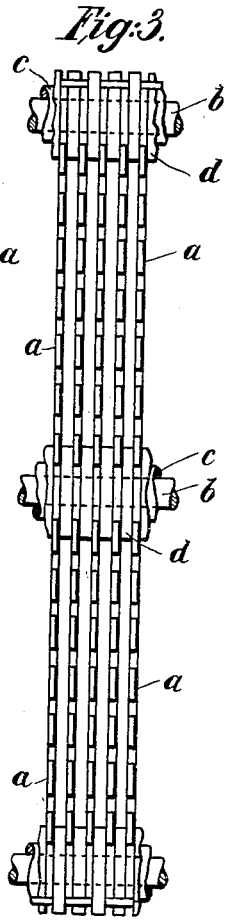
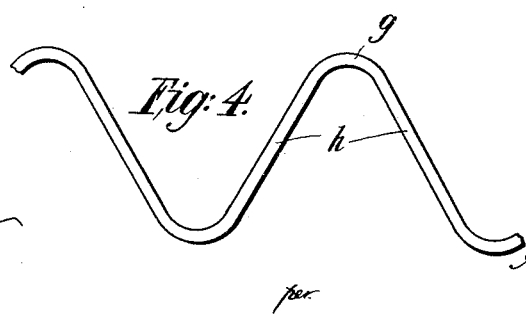
Witnesses
Inventor
Alfred Walter Maley
per Eugene C. Brown
Attorney.

UNITED STATES PATENT OFFICE.

ALFRED WALTER MALEY, OF HANDSWORTH, BIRMINGHAM, ENGLAND.

MANUFACTURE OF ELECTRICAL RESISTANCES.

1,118,906.

Specification of Letters Patent.

Patented Nov. 24, 1914.

Original application filed October 8, 1910, Serial No. 586,030. Divided and this application filed January 23, 1914. Serial No. 813,861.

*To all whom it may concern:*

Be it known that I, ALFRED WALTER MALEY, a subject of the King of Great Britain, residing formerly at 200 Beeches road, West Bromwich, in the county of Stafford, England, but now at 43 Westbourne road, New Inns, Handsworth, Birmingham, in the county of Warwick, England, have invented new and useful Improvements in the Manufacture of Electrical Resistances, of which the following is a specification.

This invention relates to electrical resistances such as starting resistances for motors, regulating resistances for generators, and for all those purposes where the use of this type is advantageous.

This invention contemplates the manufacture of resistances which have to be extremely rigid, without forming said resistances from hard and therefore difficultly workable material.

The invention consists in shaping the resistance elements from material while in an easily workable state and then transforming the material into a rigid and hard state.

More particularly defined the invention comprises a method of forming resistance elements into the required grid form from comparatively soft material and subsequently increasing the resistance uniformly throughout the length of the material and also increasing the rigidity of the grid by case hardening.

Further according to this invention a resistance grid is made up of elements made by forming soft wire into the requisite shape and subsequently case hardening the wire.

The invention yet further comprises a method of forming rheostats by stamping the resistance elements thereof from comparatively soft material and then case hardening the material.

The accompanying drawings serve to illustrate methods of forming grid resistances according to this invention.

Figure 1 is a front elevation. Fig. 2 is a plan, while Fig. 3 is a side elevation of a grid resistance made by forming wire from soft material and subsequently hardening same. And Fig. 4 illustrates a second method of forming a grid resistance by stamping from soft material, bending it, and subsequently hardening the same.

Referring to Figs. 1 to 3 in which the same reference letters refer to corresponding parts, the wire $a$ of proper cross section and of comparatively soft material is wound into a continuous zigzag in the manner of a series of grids as seen in Fig. 1 and as claimed in my co-pending patent application Serial No. 586,030 filed October 8, 1910. This material may then be hardened by carbonization by the well known process of case hardening which causes an increase in the specific resistance of the wire resulting from the addition of carbon. Successive sections are, as therein described, bent parallel or approximately parallel to each other as best shown in Fig. 2, the wires being twisted at the bend so that the depending loop $e$ is flat on its outer surface to receive terminals at the bends for tappings to external circuits. The grids are supported on bolts $b$ surrounded by insulating tubes $c$ and are separated from each other by insulating washers $d$. The bolts $b$ are clamped at their ends by means of nuts to a pair of parallel frame plates.

Where the resistance is formed, as above described from wires of soft material which are subsequently case hardened to increase the resistance and rigidity of the rheostats, it is not necessary to adhere to the grid type, although this is the best known and is very compact. Instead the wire or rod can be wound in flat coils, but this has the disadvantage that one end is in the middle. This disadvantage can, however, be avoided by forming the soft material by winding the strip over a sheet and then removing the sheet so that the rheostat remains air-insulated. Such coils may be mounted in the same way as known types of grid.

Commonly in stamping grids a difficulty is encountered owing to the fact that the strength necessary in the stamping tool determines the size of the latter, and this again determines the minimum size of opening between successive turns of the grid. This becomes particularly important when material of higher specific resistance is employed, for in this case a greater thickness of material is required and a more specific tool becomes necessary. The method of making grids as shown in Fig. 4 overcomes this difficulty. Therein the grid is stamped from the comparatively soft material in the form of a simple open sinuous strip (Fig. 4) which will allow of the use of adequately large tools even for stamping fairly thick material. As shown, a strong wedge-shaped tool may operate between the side portions $h$. The sinuous strip $g$ thus formed can be closed up by bending while still comparatively soft so that its turns lie close beside one another as in the ordinary grid. Then the resistance and rigidity of the grid is increased by the case hardening process. Of course continuous grids as shown in Figs. 1 to 3 may also be formed in this fashion.

What I claim is:

1. A method of making resistance elements consisting in forming a resistance element into the required form from comparatively soft material and increasing the rigidity of the element and the resistance uniformly throughout the length of the material by subsequently case hardening the same.

2. A method of making resistance elements having a large carbon content consisting in stamping resistance elements of the desired form from soft iron and subsequently heating said elements in carbon in order to effect case hardening thereof to thereby increase the rigidity of the element and the resistance uniformly throughout the length of the element.

3. A method of making resistance elements having a large carbon content consisting in stamping simple open sinuous strips from soft iron, closing up said strips to the desired grid form, and subsequently heating said elements in carbon in order to effect case hardening thereof to thereby increase the rigidity of the element and the resistance uniformly throughout the length of the element.

In testimony whereof I have signed my name to this specification in the presence of two subscribing witnesses.

ALFRED WALTER MALEY.

Witnesses:
　JOHNSON CODBURY,
　KATHLEEN M. THOMPSON.